(12) United States Patent
Andersson et al.

(10) Patent No.: US 11,343,841 B2
(45) Date of Patent: May 24, 2022

(54) UPLINK RESOURCE SCHEDULING IN MULTIPLE TIME INSTANCES

(71) Applicant: Telefonaktiebolaget L M Ericsson (publ), Stockholm (SE)

(72) Inventors: Håkan Andersson, Linköping (SE); Andreas Bergström, Vikingstad (SE); Stefan Parkvall, Bromma (SE); Qiang Zhang, Täby (SE); Johan Furuskog, Stockholm (SE); Lars Lindbom, Karlstad (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 473 days.

(21) Appl. No.: 14/423,171

(22) PCT Filed: Dec. 15, 2014

(86) PCT No.: PCT/SE2014/051501
§ 371 (c)(1),
(2) Date: Feb. 23, 2015

(87) PCT Pub. No.: WO2016/099345
PCT Pub. Date: Jun. 23, 2016

(65) Prior Publication Data
US 2016/0345355 A1 Nov. 24, 2016

(51) Int. Cl.
*H04W 72/14* (2009.01)
*H04W 76/27* (2018.01)
(Continued)

(52) U.S. Cl.
CPC ......... *H04W 72/14* (2013.01); *H04W 72/042* (2013.01); *H04W 72/0413* (2013.01);
(Continued)

(58) Field of Classification Search
None
See application file for complete search history.

(56) References Cited

U.S. PATENT DOCUMENTS

| | | | |
|---|---|---|---|
| 2009/0046605 A1* | 2/2009 | Gao | H04W 72/14 370/280 |
| 2012/0263117 A1* | 10/2012 | Love | H04L 5/003 370/329 |

(Continued)

FOREIGN PATENT DOCUMENTS

| | | |
|---|---|---|
| CN | 101395872 A | 3/2009 |
| JP | 2015065621 A | 4/2015 |

OTHER PUBLICATIONS

Ipwireless et al., "R1-074933: On the TDD UL Grant Channel," 3rd Generation Partnership Project (3GPP), TSG RAN WG1 #51, Nov. 5-9, 2007, 1 page, Jeju, South Korea.

(Continued)

*Primary Examiner* — Andre Tacdiran
(74) *Attorney, Agent, or Firm* — Withrow & Terranova, PLLC (57) ABSTRACT

It is disclosed a network node, a communication device and methods therein, for scheduling of uplink resources in multiple time instances and transmitting in accordance with the scheduled UL resources. By including an indicator in an UL grant comprising an UL resource allocation, the indicator indicates that, for at least one UL time instance of the multiple time instances, at least one UL resource is excluded from, or added to, the UL resource allocation of the UL grant.

32 Claims, 4 Drawing Sheets

(51) Int. Cl.
*H04W 72/04* (2009.01)
*H04W 72/12* (2009.01)
*H04W 74/08* (2009.01)

(52) U.S. Cl.
CPC ... *H04W 72/0446* (2013.01); *H04W 72/1268* (2013.01); *H04W 74/0833* (2013.01); *H04W 76/27* (2018.02); *H04W 72/12* (2013.01)

(56) References Cited

U.S. PATENT DOCUMENTS

| | | | | |
|---|---|---|---|---|
| 2013/0058233 | A1* | 3/2013 | Kim | H04L 5/001 370/252 |
| 2013/0128826 | A1* | 5/2013 | Lin | H04L 1/1861 370/329 |
| 2013/0215862 | A1* | 8/2013 | Suzuki | H04W 72/0446 370/329 |
| 2014/0010067 | A1* | 1/2014 | Guan | H04L 1/1887 370/216 |
| 2014/0105155 | A1* | 4/2014 | Kim | H04L 1/1861 370/329 |
| 2014/0161077 | A1* | 6/2014 | Choi | H04W 72/042 370/329 |
| 2014/0177487 | A1* | 6/2014 | Hammarwall | H04W 72/1289 370/280 |
| 2014/0321422 | A1* | 10/2014 | Choi | H04L 1/1861 370/330 |
| 2015/0078222 | A1* | 3/2015 | Yang | H04B 7/2656 370/280 |
| 2015/0078275 | A1* | 3/2015 | Kim | H04W 72/1289 370/329 |
| 2015/0131536 | A1* | 5/2015 | Kaur | H04L 5/001 370/329 |
| 2015/0334729 | A1* | 11/2015 | Ji | H04W 72/0453 370/336 |
| 2016/0029349 | A1* | 1/2016 | Vargantwar | H04W 72/04 370/329 |
| 2016/0192385 | A1* | 6/2016 | Tooher | H04L 5/0051 370/336 |
| 2017/0318565 | A1* | 11/2017 | Golitschek Edler von Elbwart | H04W 72/042 |

OTHER PUBLICATIONS

Nokia et al., "R1-074324: Multi-TTI Uplink Grants for TDD (FS1+FS2)," 3rd Generation Partnership Project (3GPP), TSG RAN WG1 #50bis Meeting, Oct. 8-12, 2007, 5 pages, Shanghai, China.
International Search Report and Written Opinion for International Patent Application No. PCT/SE2014/051501, dated Jun. 11, 2015, 10 pages.
Notification of Reasons for Refusal for Japanese Patent Application No. 2017-531683, dated Jan. 18, 2019, 5 pages.
Examination Report for European Patent Application No. 14824583. 0, dated Aug. 1, 2018, 6 pages.
Notification of Reasons for Refusal for Japanese Patent Application No. 2017-531683, dated Aug. 7, 2018, 6 pages.
First Office Action for Chinese Patent Application No. 201480084112.8 CN, dated Aug. 7, 2019, 15 pages.
Examination Report for European Patent Application No. 14824583. 0, dated Jun. 28, 2019, 6 pages.
Author Unknown, "Technical Specification Group Radio Access Network; Evolved Universal Terrestrial Radio Access (E-UTRA); Physical channels and modulation (Release 12)," Technical Specification 36.211, Version 12.3.0, Sep. 2014, 3GPP Organizational Partners, 124 pages.
Author Unknown, "Technical Specification Group Radio Access Network; Evolved Universal Terrestrial Radio Access (E-UTRA); Multiplexing and channel coding (Release 12)," Technical Specification 36.212, Version 12.2.0, Sep. 2014, 3GPP Organizational Partners, 89 pages.
Author Unknown, "Technical Specification Group Radio Access Network; Evolved Universal Terrestrial Radio Access (E-UTRA); Physical layer procedures (Release 12)," Technical Specification 36.213, Version 12.3.0, Sep. 2014, 3GPP Organizational Partners, 212 pages.

* cited by examiner

UPLINK RESOURCE SCHEDULING IN MULTIPLE TIME INSTANCES

This application is a 35 U.S.C. § 371 national phase filing of International Application No. PCT/SE2014/051501, filed Dec. 15, 2014, the disclosure of which is incorporated herein by reference in its entirety.

TECHNICAL FIELD

This disclosure relates to multi-subframe scheduling and multiplexing of physical uplink channels. In more particular, it relates to a network node, a communication device, and methods therein, related to scheduling of uplink resources in multiple time instances and transmitting UL data in accordance to said scheduled uplink resources.

BACKGROUND

In a time-division duplexing (TDD) system, uplink (UL) and downlink (DL) transmissions occur on the same frequency band but at different time instances. A given subframe may only be allocated for transmission in either UL or DL.

Figure 1:
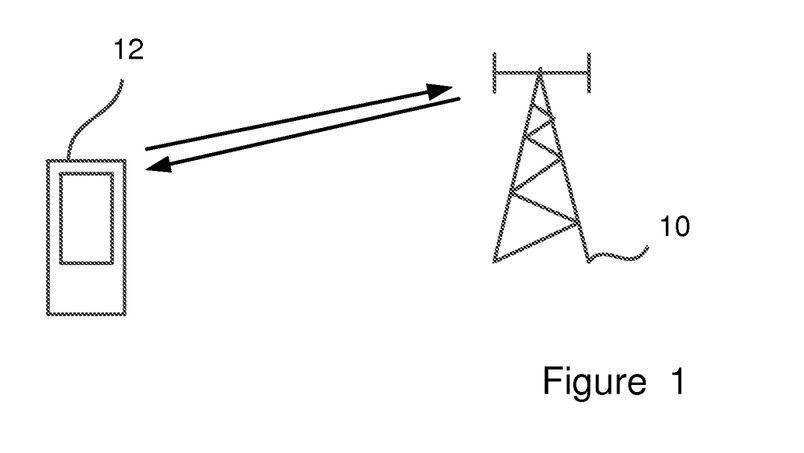
FIG. 1 schematically illustrates a communication device communicating with a base station.

FIG. 1 schematically illustrates a communication device 10 communicating with a base station 12 in both UL and DL.

In a static TDD system, a fixed pattern, i.e. TDD configuration, specifies which subframes are designated for UL and DL, respectively.

In a fully dynamic TDD system, there is no fixed pattern that specifies which subframes are designated for UL and DL, respectively.

Instead, which subframes are to be used for UL and DL transmissions is decided continuously or "one-the-fly" by a scheduler of a base station depending on the UL/DL traffic pattern.

Certain restrictions on what the subframes are used for do apply, however. Some subframes are fixed to be DL subframes to allow transmission of, e.g., DL control information and channel state information—reference symbols (CSI-RS).

Other subframes are fixed for UL transmissions of UL control information and/or random-access signaling.

For example, in a scenario with a high demand of UL-subframes there may be a single DL subframe followed by n consecutive UL subframes, where n may be on the order of several tens. In this scenario, all n UL subframes must be scheduled by the base station and granted to a communication device, such as a user equipment (UE), in said single DL subframe. This is known as multi-subframe scheduling. The resource allocation granted to the UE is then applied to all subsequent UL subframes and is valid until a new UL grant is received by the communication device.

To support downlink data transmission, there is a need for feedback information in the UL. Examples hereof are acknowledgements, indicating whether data transmitted in the DL was successfully received or not, and CSI.

In currently available releases of the long-term evolution (LTE) standard the physical uplink control channel (PUCCH), is the dedicated UL control channel. It is always transmitted on a number of physical resource blocks (PRBs) located at edges of a system bandwidth. These PRBs are reserved for UL control signaling and are therefore never scheduled for Physical uplink shared channel (PUSCH) transmissions.

In future releases of LTE an evolved PUCCH, also known as EPUCCH, has been defined. This channel is envisioned to be more flexible in the sense that it may allocate sets of PRBs anywhere in the spectrum and these allocations may be used by different sets of UEs.

Which EPUCCH resources a specific UE may use, may be configurable through be higher-layer signalling explicitly, or implicitly, in the UL grant. The base station may, by using DL control channels, request feedback information from a communication device on the EPUCCH. Typically, a single subframe is sufficient for providing feedback information, regardless of how many subframes the base station did schedule for UL data transmission.

A problem with existing scheduling techniques is unused UL resources, which is a consequence of PUCCH/EPUCCH resources being reserved but which cannot be used applying current UL grant format. Unused UL resources are hence a waste.

The current UL grant format schedules a resource allocation in the UL, and is applied to all UL subframes until a new UL grant is received in the particular UE.

One example of the problem is the following:

Suppose that a first UE has been granted a resource allocation for PUSCH transmission during a multitude of consecutive UL subframes. Further, suppose that a second UE is scheduled to transmit on the EPUCCH in one of said UL subframes. There are basically two potential situations:

In a first situation, a number of PRBs are always reserved for the EPUCCH. These PRBs may be a common resource for all UEs, when the EPUCCH is multiplexed between said UEs, or separate resources per UE or sets of UEs. These reserved resources may then be avoided by the base station when scheduling resources for the first UE (and all other UEs) in UL, in order not to cause collisions between PUSCH transmissions from the first UE with the EPUCCH transmission from the second UE2.

However, this is wasteful in a scenario when the EPUCCH is only used once or at most a few times, during the duration of n UL subframes. In all of the remaining subframes, where resources reserved for EPUCCH were unused, these could have been used by PUSCH transmissions instead, had there been a scheduling mechanism available.

The scheduling of UL resources in a UL grant is applied to all PUSCH subframes, until another UL grant is received by the UE. This may lead to the wasteful scenario.

Moreover, said another UL grant containing a PUSCH resource allocation suitable for simultaneous EPUCCH usage, is transmitted on the evolved physical DL control channel (EPDCCH) in a DL subframe immediately preceding the UL subframe of the granted UL resource, which is very wasteful when the demand for UL subframes is pronounced.

In a second situation, the scheduler does not take the reserved allocation for a potential EPUCCH transmission into account, but uses other resources for EPUCCH transmission. In this case the scheduling results in collisions between PUSCH transmission of the first UE and any EPUCCH transmission from other UEs.

A similar situation occurs when there are physical random-access channel (PRACH) sources reserved in UL subframes. These are PRBs reserved for potential random-access signaling from any UE. Random-access signaling occurs in some, typically rather few, of the UL subframes being reserved, and therefore gives rise to the same problem as the EPUCCH.

With the current scheduling mechanism there are either potential collisions between PRACH transmissions and PUSCH transmissions of the first UE, or resources reserved for PRACH transmissions are wasted by not being used in any UL subframes.

A random-access attempt may however be scheduled by the base station. In this case it may be implicitly understood that resources therefore should be excluded from the UL grant in this particular subframe. However, many random-access attempts are not scheduled and in such a case the base station may schedule UL data in those resources, leading to a situation where collisions cannot be precluded.

There is hence a need for a solution addressing the issues as discussed above.

SUMMARY

It is an object of exemplary embodiments to address at least some of the issues outlined above, and this object and others are achieved by a network node and a communication device and methods therein, according to the appended independent claims, and by the exemplary embodiments according to the dependent claims.

According to an aspect, the exemplary embodiments provide a method performed by a network node for scheduling of uplink (UL) resources in multiple time instances. The method comprises including an indicator in an UL grant comprising an UL resource allocation, where the indicator indicates that, for at least one UL time instance of the multiple time instances, at least one UL resource is excluded from or added to the UL resource allocation of the UL grant. The method also comprises transmitting the UL grant including the indicator, to at least one communication device. In addition, the method comprises receiving from the at least one communication device, an uplink transmission in accordance with the transmitted UL grant.

According to another aspect, the exemplary embodiments provide a network node adapted to schedule uplink UL resources in multiple time instances. The network node comprises a processor and a memory. The memory comprises instructions executable by the processor whereby the network node is operative to include an indicator in an UL grant comprising an UL resource allocation, where the indicator indicates that, for at least one UL time instance of the multiple time instances, at least one UL resource is excluded from or added to the UL resource allocation of the UL grant. The network node is further operative to transmit the UL grant including the indicator, to at least one communication device. In addition, the network node is also operable to receive from the at least one communication device, an uplink transmission in accordance with the transmitted UL grant.

According to yet another aspect, the exemplary embodiments provide a method in a communication device. The method comprises receiving, from a network node, an UL grant comprising an UL resource allocation and further comprising an indicator indicating that, for at least one UL time instance of multiple time instances, at least one UL resource is excluded from, or added to, the UL resource allocation of the UL grant. The method also comprises decoding the UL grant and the indicator in the UL grant. The method also comprises determining, from the UL grant, the UL resource allocation and determining, from the indicator, the at least one UL resource. In addition, the method comprises transmitting, UL data to the network node, in accordance with the determined UL resource allocation and the determined at least one UL resource.

According to still yet another aspect, the exemplary embodiments provide a communication device comprising a processor and a memory. The memory comprises instructions executable by the processor whereby the communication device is operative to receive from a network node, an UL grant comprising an UL resource allocation and further comprising an indicator indicating that, for at least one UL time instance of multiple time instances, at least one UL resource is excluded from or added to the UL resource allocation of the UL grant. The memory also comprises instructions executable by the processor whereby the communication device is operative to decode the UL grant and the indicator in the UL grant. The memory also comprises instructions executable by the processor whereby the communication device is operative to determine, from the UL grant, the UL resource allocation and determining, from the indicator, the at least one UL resource. In addition, the memory comprises instructions executable by the processor whereby the communication device is operative to transmit, uplink data to the network node, in accordance with the determined UL resource allocation and the determined at least one UL resource.

The present disclosure provides a number of advantages:

A single scheduling grant may handle the problematic situation as described in the background section. A minor increase in UL grant size, in the form of an indicator, enables collision-free transmissions on physical channels used by communication devices, without having to waste UL resources by reserving resources in every subframe and mostly not using said reserved resources.

It is also an advantage that resources allocated for UL control information or PRACH may be dynamically changed according to instantaneous system load by dynamically changing the indicator indicating that at least one UL resource is excluded from or added to the UL resource allocation of the UL grant.

BRIEF DESCRIPTION OF THE DRAWINGS

Embodiments will now be described in more detail, and with reference to the accompanying drawings, in which.

DETAILED DESCRIPTION

In the following description, different embodiments of the exemplary embodiments will be described in more detail, with reference to accompanying drawings. For the purpose of explanation and not limitation, specific details are set forth, such as particular examples and techniques in order to provide a thorough understanding.

The present invention proposes to augment an existing uplink grant format for allocation of resources by including an indicator that indicates to a communication device that resource allocation in one or more specific subframes shall be modified in a certain manner, compared to resource allocation in other subframes.

The herein proposed augmented UL grant format is used for allocating multi-subframe resources.

The indicator as proposed herein, may be viewed as a modifier, a modifier field or fields which indicate a communication device such as a user equipment (UE) that for a specific subframe, or subframes, the resource allocation shall be modified in a certain manner.

The indicator or modifier may indicate that some indicated resource blocks (RBs) in the UL grant are not included in one or more specific subframe(s), and thus, leave room for PUCCH/EPUCCH/PRACH transmissions from UEs.

The indicator or modifier may indicate that some additional RBs, which are not contained in a regular, i.e. unmodified, grant, are added and used for PUSCH in the subframe(s) with added RBs. This enables to use these additional RBs for PUSCH in subframes where no PUCCH/EPUCCH/PRACH transmissions occur.

The indicator or modifier may be such that the indicated RBs are completely specified by indicator, or the modifier, without reference to the unmodified original allocation.

The subframe that is to have its resource allocation modified may be the first UL subframe after the DL subframe containing the UL grant, after which the unmodified resource allocation is used for all subsequent UL subframes, until a new UL grant is received.

The indicator may be an indicator field containing information, for example a bit field, which points to, or by any other way specifies, a set of specific subframes for which the modified resource allocation should be applied.

The indicator may be included in a UL grant and refer to a set of resources configured by higher-layer signaling, such as a radio resource control (RRC) message. A communication device receiving such an UL grant avoids transmitting PUSCH on the configured resources in the uplink subframes where the modification is applied.

The indicator or modifier may indicate that a set of multiple different modifications may be configured by higher-layer signaling such as by a RRC message. The network may signal a selected modifier index in the UL grant indicating which modification in the set that should be applied.

The indicator may also indicate that different modifications shall be applied in different subframes. The modifications may be selected from one and the same pre-configured set of modifications or by using different sets.

This modified resource allocation allows PUCCH/EPUCCH, PRACH and PUSCH transmissions without risking collisions with each other, as will be discussed further below.

Existing UL grant formats contain UL resource allocation in the form of resource block (RB) allocation. RB allocation may be used for the multi-subframe scheduling as indicated above.

Figure 2:
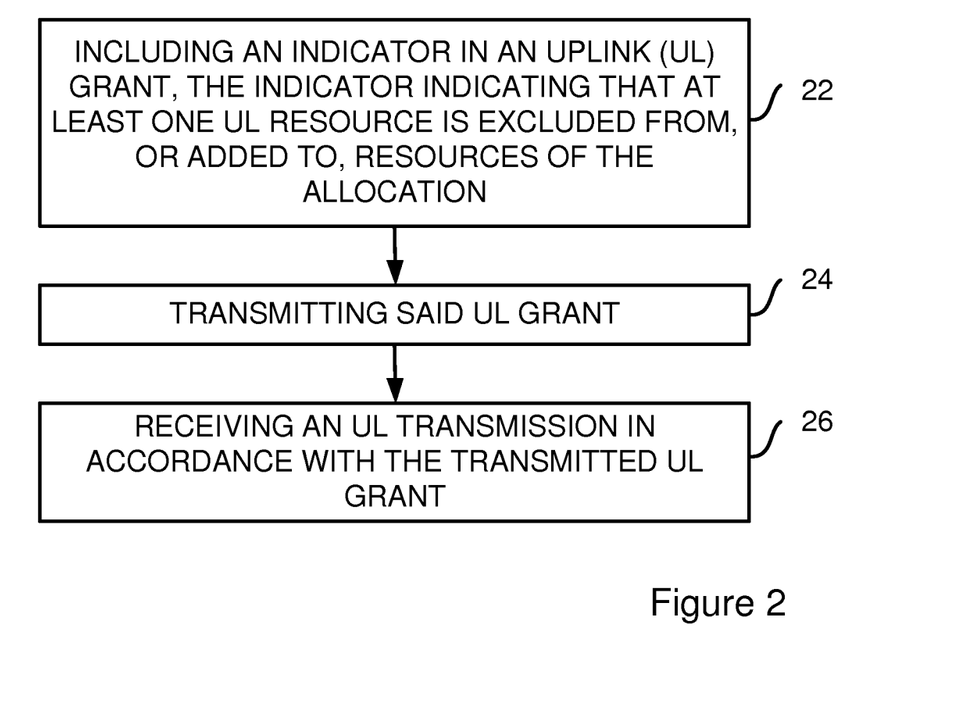
FIG. 2 illustrates a flowchart of a method performed in a network node, according to exemplary embodiments.

FIG. 2 illustrates a flowchart of a method performed by a network node, according to exemplary embodiments. The method is performed for scheduling of uplink (UL) resources in multiple time instances. The method comprises including 22 an indicator in an UL grant comprising an UL resource allocation, where the indicator indicates that, for at least one UL time instance of the multiple time instances, at least one UL resource is excluded from, or added to, the UL resource allocation of the UL grant. The method also comprises transmitting 24 the UL grant including the indicator, to at least one communication device. In addition, the method comprises receiving 26 from the at least one communication device, an uplink transmission in accordance with the transmitted UL grant.

The indicator indicating that for the at least one UL time instance, the at least one UL resource, may correspond to at least one resource block (RB), excluded from the resource blocks of the UL resource allocation of the UL grant. For example, by excluding an UL resource from the resource blocks of the UL resource allocation, these excluded resources may be used for PUCCH/EPUCCH or PRACH transmissions by one or more communication devices.

The indicator indicating that for the at least one UL time instance, the at least one UL resource, may correspond to at least one RB, added to the resource blocks of the UL resource allocation of the UL grant. For example, resources corresponding to non-used PUCCH/EPUCCH or PRACH resources may be added to the allocated resources and used for PUSCH transmissions.

The at least one UL time instance of the method may be a first UL subframe following the time instance during which the UL grant, including the indicator, is transmitted.

The indicator may indicate that for a set of UL time instances comprising the at least one UL time instance, the at least one UL resource, is excluded from, or added to, the UL resource allocation of the UL grant. The (UL) time instance may be a subframe or a scheduling time interval.

Figure 3:
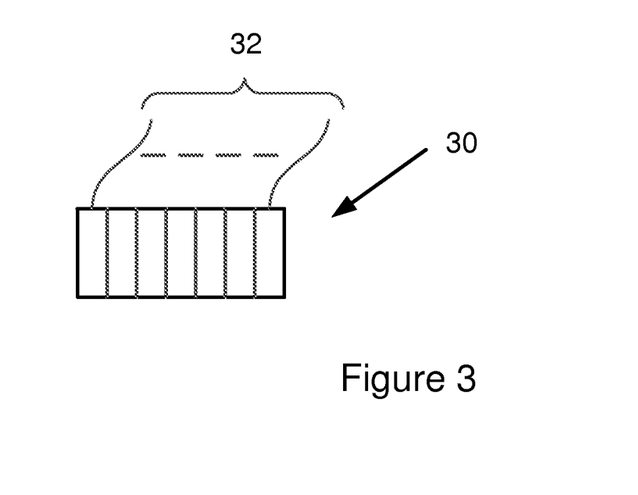
FIG. 3 schematically illustrates an indicator of a scheduling grant, according to exemplary embodiments.

The indicator may be a bit field comprising at least one bit and wherein the bit field points at the at least one UL time instance of the multiple time instances. FIG. 3 schematically illustrates an indicator 30 having a number of bit fields 32 pointing at the at least one UL time instance of the multiple of time instances.

The indicator or the modifier modifying an existing format of a UL grant format such that one or more UL subframes of the resources being allocated have modified allocations, compared to other UL subframes not being specified or indicated by the modifier or indicator.

The indicator may alternatively indicate a set of said UL resources configured by higher-layer signaling such as a radio resource control message. Higher-layer signaling may mean transmission of a message, command or configuration from the network node to the communication device(s).

The set of UL resources indicated by an index in the UL grant indicating that for, the at least one UL time instance of the multiple time instances, the at least one UL resource of the set of resources, may be excluded from, or added to, the UL resource allocation of the UL grant.

Figure 4:
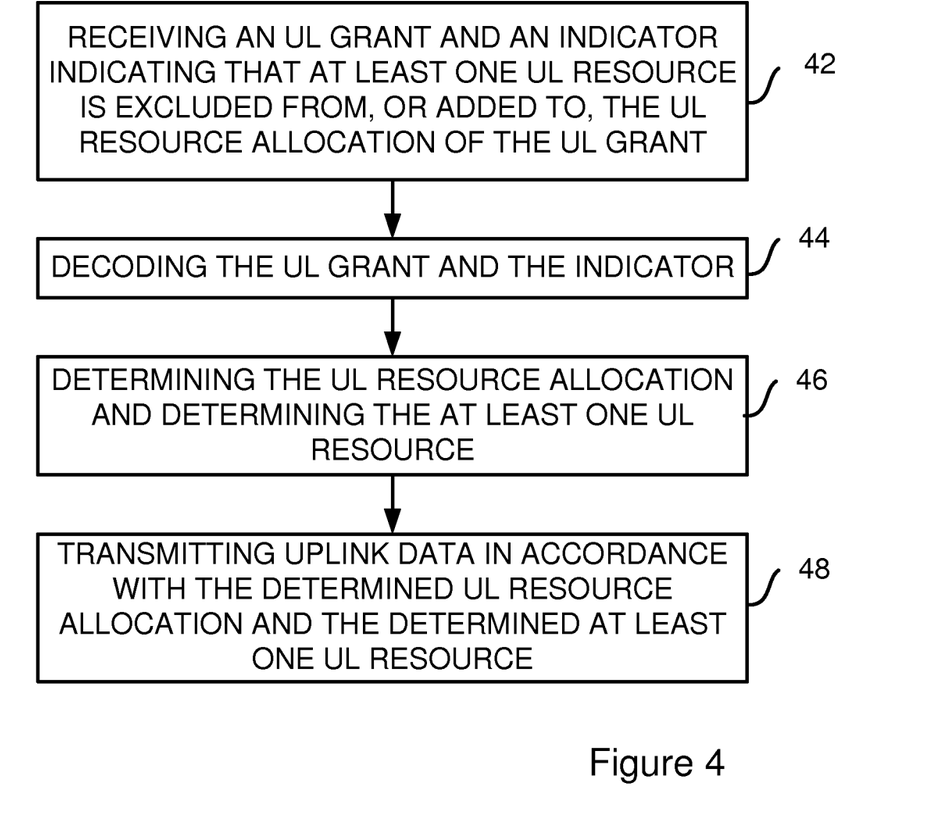
FIG. 4 illustrates a flowchart of a method performed in a communication device, according to exemplary embodiments.
Figure 7:
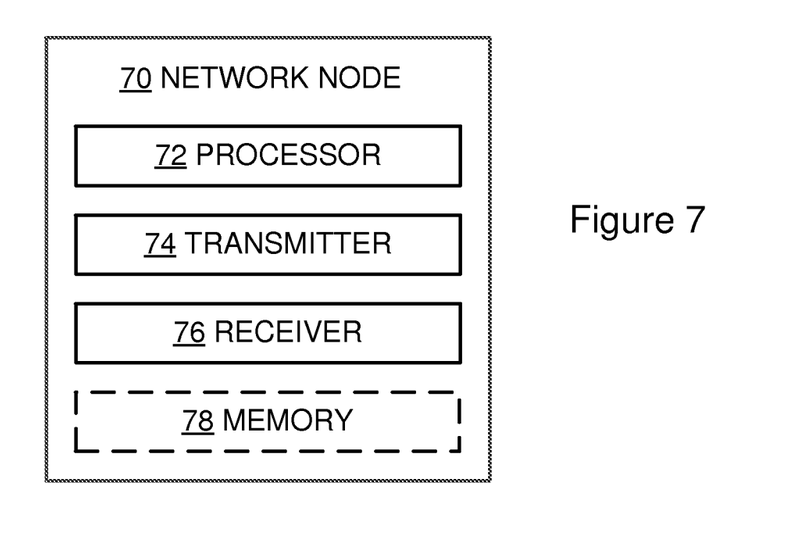
Figure 8:
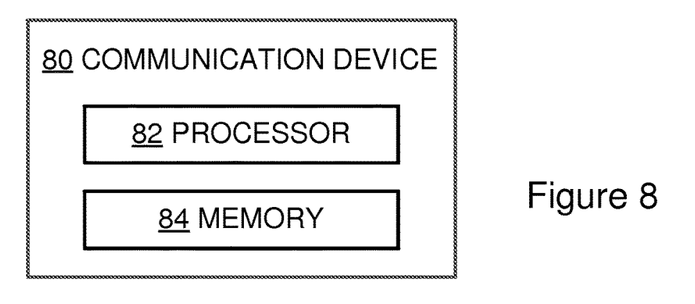
FIGS. 8-10 present communication devices according to exemplary embodiments.
Figure 9:
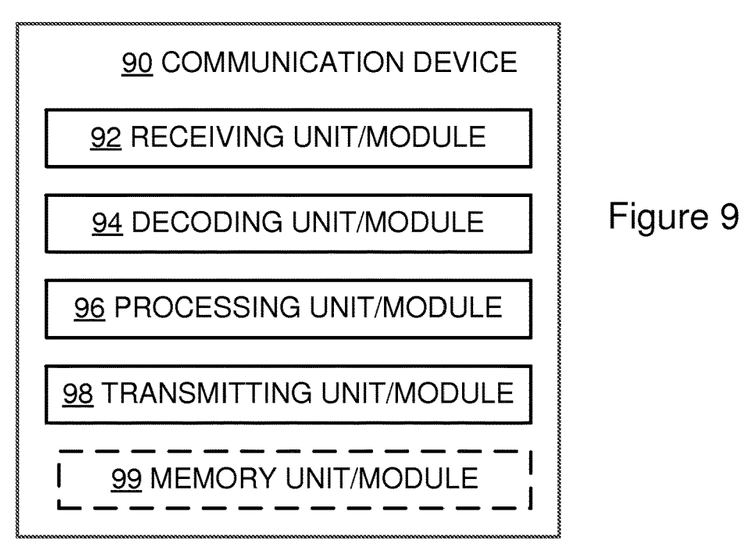
Figure 10:
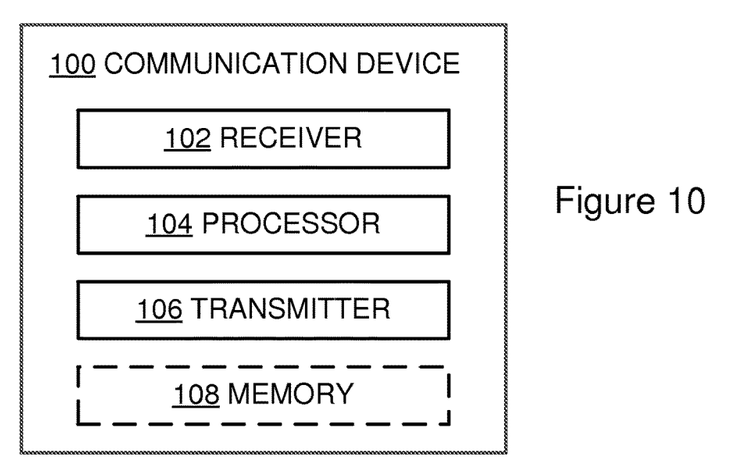

FIG. 4 illustrates a flowchart of a method performed in a communication device 80, 90, 100, presented in FIGS. 8, 9 and 10, respectively. The method comprises receiving 42, from a network node 50; 60; 70, presented in FIGS. 5, 6 and 7, respectively, an UL grant comprising an UL resource allocation and further comprising an indicator indicating that, for at least one UL time instance of multiple time instances, at least one UL resource is excluded from, or added to, the UL resource allocation of the UL grant. The method also comprises decoding 44 the UL grant and the indicator in the UL grant. The method also comprises determining 46, from the UL grant, the UL resource allocation and determining, from the indicator, the at least one UL resource. In addition, the method comprises transmitting 48, UL data to the network node, in accordance with the determined UL resource allocation and the determined at least one UL resource.

If the indicator or modifier indicates that for the least one UL time instance, the at least one UL resource is excluded from the UL resource allocation of the UL grant, the method may comprise refraining from transmitting uplink data to the network node on the excluded UL resource. For example, if the indicator indicates that the at least one UL resource is excluded from the UL resource allocation of the UL grant, the method may comprise using these excluded resources for PUCCH/EPUCCH or PRACH transmissions by the communication devices.

If the indicator indicates that for the least one UL time instance, the at least one UL resource is added to the UL resource allocation of the UL grant, the method may comprise transmitting uplink data to the network node on the UL resources of the resource allocation and also on the added UL resource. For example, if the indicator indicates that resources are added to the UL resource allocation, resources corresponding to non-used PUCCH/EPUCCH or PRACH resources, may be used for PUSCH transmissions.

The at least one UL time instance may be a first UL subframe or a first scheduling UL time interval following the time instance/interval during which the UL grant including the indicator is received.

The indicator may indicate that for a set of UL time instances comprising the at least one UL time instance, the at least one UL resource, is excluded from, or added to, the UL resource allocation of the UL grant.

The indicator may be a bit field comprising at least one bit and wherein the bit field points at the at least one UL time instance of the multiple time instances.

The indicator may indicate a set of said UL resources configured by higher-layer signaling such as a radio resource control message received from the network node.

The indicator in the UL grant may indicate that for, the at least one UL time instance of the multiple time instances, the at least one UL resource of the set of resources, is excluded from, or added to, the UL resource allocation of the UL grant.

Figure 5:
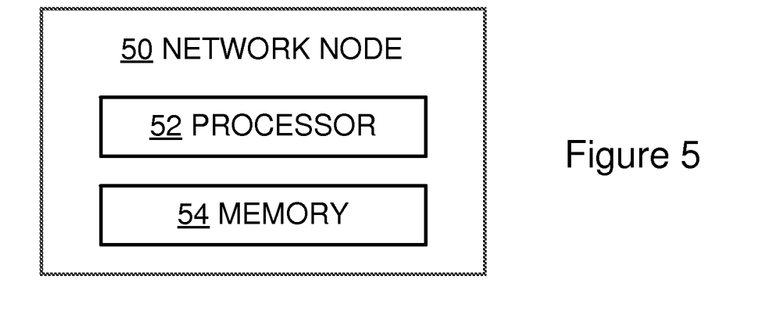
FIGS. 5-7 present network nodes according to exemplary embodiments.

FIG. 5 schematically presents a network node 50 configured to schedule uplink, UL, resources in multiple time instances. The network node 50 comprises a processor 52 and a memory 54. The memory 54 comprises instructions executable by the processor 52 whereby the network node 50 is operative to include an indicator in an UL grant comprising an UL resource allocation, the indicator indicating that, for at least one UL time instance of the multiple time instances, at least one UL resource is excluded from or added to the UL resource allocation of the UL grant. The memory 54 also comprises instructions executable by the processor 52 whereby the network node 50 is operative to transmit the UL grant including the indicator, to at least one communication device. The memory 54 also comprises instructions executable by the processor 52 whereby the network node 50 is operative to receive from the at least one communication device, an uplink transmission in accordance with the transmitted UL grant.

According to an embodiment, the indicator indicates that for the at least one UL time instance, the at least one UL resource corresponding to at least one resource block, RB, is excluded from the resource blocks of the UL resource allocation of the UL grant.

According to an embodiment, the indicator indicates that for the at least one UL time instance, the at least one UL resource corresponding to at least one resource block, RB, is added to the resource blocks of the UL resource allocation of the UL grant.

The at least one UL time instance may be a first UL subframe following the time instance during which the UL grant including the indicator is transmitted.

According to an embodiment, the indicator indicates that for a set of UL time instances comprising the at least one UL time instance, the at least one UL resource, is excluded from, or added to, the UL resource allocation of the UL grant.

According to an embodiment, the indicator is a bit field comprising at least one bit and wherein the bit field points at the at least one UL time instance of the multiple time instances.

According to an embodiment, the indicator indicates a set of said UL resources configured by higher-layer signaling such as a radio resource control message.

According to an embodiment the indicator indicates that for, the at least one UL time instance of the multiple time instances, the at least one UL resource of the set of UL resources, is excluded from, or added to, the UL resource allocation of the UL grant.

Figure 6:
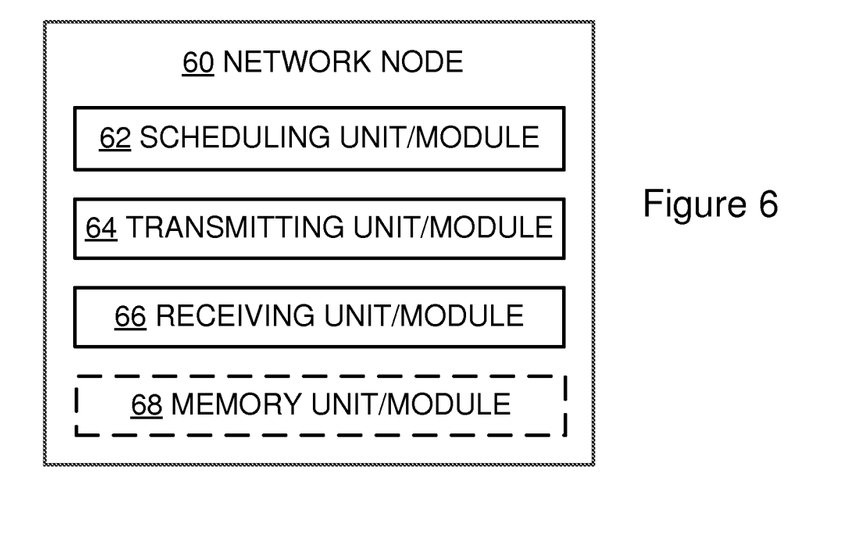

FIG. 6 schematically presents a network node 60 configured to schedule uplink, UL, resources in multiple time instances. The network node 60 comprises a scheduling unit/module 62, a transmitting unit/module 64 and a receiving unit/module 66. The scheduling unit/module 62 is configured to include an indicator in an UL grant comprising an UL resource allocation, the indicator indicating that, for at least one UL time instance of the multiple time instances, at least one UL resource is excluded from or added to the UL resource allocation of the UL grant. The transmitting unit/module 64 is configured to transmit 34 the UL grant including the indicator, to at least one communication device. The receiving unit/module 66 is further configured to receive 36 from the at least one communication device, an uplink transmission in accordance with the transmitted UL grant.

The scheduling unit/module 62 may be part of a processing unit/module of the network node 60. Similarly, one or more of the units/modules of the network node 60, may be another unit/module of the network node 60. The network node 60 may also comprise a memory unit/module 68.

For the reason that embodiments disclosing what the indicator may indicate have already been disclosed, these are not repeated.

FIG. 7 also schematically presents a network node 70 configured to schedule uplink, UL, resources in multiple time instances. The network node 70 comprises a processor 72, a transmitter 74 and a receiver 76. The processor 72 is configured to include an indicator in an UL grant comprising an UL resource allocation, the indicator indicating that, for at least one UL time instance of the multiple time instances, at least one UL resource is excluded from or added to the UL resource allocation of the UL grant. The transmitter 74 is configured to transmit the UL grant including the indicator, to at least one communication device. The receiver 76 is configured to receive from the at least one communication device, an uplink transmission in accordance with the transmitted UL grant.

The processor 72 may be part of another unit or module of the network node 70. The network node 70 may also comprise a memory 78.

Embodiments disclosing what the indicator or modifier may indicate have already been disclosed and are therefore not repeated.

FIG. 8 schematically presents a communication device 80 comprising a processor 82 and a memory 84. The memory 84 comprises instructions executable by the processor 82 whereby the communication device 80 is operative to receive from a network node 50; 60; 70, an UL grant comprising an UL resource allocation and further comprising an indicator indicating that, for at least one UL time instance of multiple time instances, at least one UL resource is excluded from or added to the UL resource allocation of the UL grant. The memory 84 also comprises instructions executable by the processor 82 whereby the communication device 80 is operative to decode the UL grant and the indicator in the UL grant. The memory 84 also comprises instructions executable by the processor 82 whereby the communication device 80 is operative to determine, from the UL grant, the UL resource allocation and determining, from the indicator, the at least one UL resource. In addition, the memory 84 comprises instructions executable by the processor 82 whereby the communication device 80 is operative to transmit, uplink data to the network node, in accordance with the determined UL resource allocation and the determined at least one UL resource.

According to an embodiment, if the indicator indicates that for the least one UL time instance, the at least one UL resource is excluded from the UL resource allocation of the UL grant; the communication device 80 is operative to refrain from transmitting uplink data to the network node using the excluded UL resource.

According to an embodiment, if the indicator indicates that for the least one UL time instance, the at least one UL resource is added to the UL resource allocation of the UL grant; the communication device 80 is operative to transmit uplink data to the network node using the UL resources of the resource allocation and also using the added UL resource.

The at least one UL time instance may be a first UL subframe following the time instance during which the UL grant including the indicator is received.

According to an embodiment, the indicator indicates that for a set of UL time instances comprising the at least one UL time instance, the at least one UL resource, is excluded from, or added to, the UL resource allocation of the UL grant.

According to an embodiment the indicator is a bit field comprising at least one bit and that the bit field points at the at least one UL time instance of the multiple time instances.

According to an embodiment, the indicator indicates a set of said UL resources configured by higher-layer signaling such as a radio resource control message received from the network node.

According to an embodiment, the set of said UL resources is indicated by an index in the UL grant indicating that for, the at least one UL time instance of the multiple time instances, the at least one UL resource of the set of resources, is excluded from, or added to, the UL resource allocation of the UL grant.

FIG. 9 schematically presents a communication device 90 comprising a receiving unit/module 92, a decoding unit/module 94, a processing unit/module 96 and a transmitting unit/module 98. The receiving unit/module 92 is configured to receive from a network node 50; 60; 70, an UL grant comprising an UL resource allocation and further comprising an indicator indicating that, for at least one UL time instance of multiple time instances, at least one UL resource is excluded from or added to the UL resource allocation of the UL grant. The decoding unit/module 94 is configured to decode the UL grant and the indicator in the UL grant. The processing unit/module 96 is configured to determine, from the UL grant, the UL resource allocation and determining, from the indicator, the at least one UL resource. The transmitting unit/module 98 is configured to transmit, uplink data to the network node, in accordance with the determined UL resource allocation and the determined at least one UL resource.

The decoding unit/module 94 may be part of the processing unit/module 96. Similarly, one or more of the units/modules of the communication device 90, may be comprised in another unit/module of the communication device 90. The communication device 90 may comprise a memory unit/module 99.

Embodiments disclosing what the indicator or modifier may indicate have already been disclosed and are for this reason not repeated here.

FIG. 10 also schematically presents a communication device 100 comprising a receiver 102, a processor 104, and a transmitter 106. The receiver 102 is configured to receive from a network node 50; 60; 70, an UL grant comprising an UL resource allocation and further comprising an indicator indicating that, for at least one UL time instance of multiple time instances, at least one UL resource is excluded from or added to the UL resource allocation of the UL grant. The processor 104 is configured to decode the UL grant and the indicator in the UL grant. The processor 104 is also configured to determine, from the UL grant, the UL resource allocation and determining, from the indicator, the at least one UL resource. The transmitter 106 is configured to transmit, uplink data to the network node, in accordance with the determined UL resource allocation and the determined at least one UL resource.

The communication device 100 may comprise a memory 108.

The processor 104 may be part of another unit or module of the communication device 100.

Since embodiments disclosing what the indicator or modifier may indicate have already been disclosed, they are not repeated.

The network node 50; 60; 70 may comprise an eNodeB.

The communication device 80; 90; 100 may be a UE.

The present disclosure also comprises a computer program, comprising instructions, when executed on at least one processor, cause the at least one processor to carry out the method according to any one of the appended claims 1 to 8, and 17 to 24.

The present disclosure also comprises a carrier containing the computer program of the previous claim, wherein the carrier is one of an electronic signal, optical signal, radio signal, or a computer readable storage medium.

It has thus been presented an introduction of an indicator or modifier in an UL grant indicating a modified UL resource allocation of said UL grant, which enables a more flexible UL scheduling mechanism, as compared to the current UL grant format.

Embodiments of the present exemplary embodiments have the following advantages:

A single scheduling grant may handle the problematic situation as described in the background section. A minor increase in UL grant size, in the form of an indicator, enables collision-free transmissions on physical channels used by communication devices, without having to waste UL resources by reserving resources in every subframe and mostly not using said reserved resources.

It is also an advantage that resources allocated for UL control information or PRACH may be dynamically changed according to instantaneous system load by dynamically changing the indicator indicating that at least one UL resource is excluded from or added to the UL resource allocation of the UL grant.

It may be further noted that the above described embodiments are only given as examples and should not be limiting to the present exemplary embodiments, since other solutions, uses, objectives, and functions are apparent within the scope of the embodiments as claimed in the accompanying patent claims.

ABBREVIATIONS

CSI-RS channel-state information-reference symbols
DL downlink
eNB evolved nodeB
EPDCCH evolved physical DL control channel
PUCCH physical UL control channel
EPUCCH evolved physical UL control channel
LTE long-term evolution
PRB physical resource block
PUSCH physical UL shared channel
PRACH physical random-access channel
TDD time-division duplex
UE user equipment
UL uplink

The invention claimed is:

1. A method performed by a network node for scheduling of uplink, UL, resources in multiple time instances, the method comprising:
including, in an UL grant comprising an UL resource allocation comprising UL resources in multiple UL time instances, an indicator indicating that, for at least one UL time instance of the multiple time instances, at least one UL resource is excluded from or added to the UL resource allocation of the UL grant;
transmitting the UL grant including the indicator to at least one communication device, and
receiving from the at least one communication device, an uplink transmission in accordance with the transmitted UL grant.

2. The method according to claim 1, wherein said indicator indicating that for the at least one UL time instance, the at least one UL resource corresponding to at least one resource block, RB, is excluded from resource blocks of the UL resource allocation of the UL grant.

3. The method according to claim 1, wherein said indicator indicating that for the at least one UL time instance, the at least one UL resource corresponding to at least one resource block, RB, is added to resource blocks of the UL resource allocation of the UL grant.

4. The method according to claim 1 where the at least one UL time instance is a first UL subframe following the time instance during which the UL grant including the indicator is transmitted.

5. The method according to claim 1 wherein the indicator indicating that for a set of UL time instances comprising the at least one UL time instance, the at least one UL resource, is excluded from, or added to, the UL resource allocation of the UL grant.

6. The method according to claim 1 wherein the indicator is a bit field comprising at least one bit and wherein the bit field points at the at least one UL time instance of the multiple time instances.

7. The method according to claim 1, wherein the indicator indicates a set of the at least one UL resource configured by higher-layer signaling.

8. The method according to claim 7 wherein the set of the at least one UL resource is indicated by an index in the UL grant indicating that for, the at least one UL time instance of the multiple time instances, the at least one UL resource of the set of resources, is excluded from, or added to, the UL resource allocation of the UL grant.

9. A network node adapted to schedule of uplink, UL, resources in multiple time instances, the network node comprising a processor and a memory, the memory comprising instructions executable by the processor whereby the network node is operative to:
include, in an UL grant comprising an UL resource allocation comprising UL resources in multiple UL time instances, an indicator indicating that, for at least one UL time instance of the multiple time instances, at least one UL resource is excluded from or added to the UL resource allocation of the UL grant;
transmit the UL grant including the indicator to at least one communication device,
and
receive from the at least one communication device, an uplink transmission in accordance with the transmitted UL grant.

10. The network node according to claim 9, wherein said indicator indicating that for the at least one UL time instance, the at least one UL resource corresponding to at least one resource block, RB, is excluded from resource blocks of the UL resource allocation of the UL grant.

11. The network node according to claim 9, wherein said indicator indicating that for the at least one UL time instance, the at least one UL resource corresponding to at least one resource block, RB, is added to resource blocks of the UL resource allocation of the UL grant.

12. The network node according to claim 9 where the at least one UL time instance is a first UL subframe following the time instance during which the UL grant including the indicator is transmitted.

13. The network node according to claim 9 wherein the indicator indicating that for a set of UL time instances comprising the at least one UL time instance, the at least one UL resource, is excluded from, or added to, the UL resource allocation of the UL grant.

14. The network node according to claim 9 wherein the indicator is a bit field comprising at least one bit and wherein the bit field points at the at least one UL time instance of the multiple time instances.

15. The network node according to claim 9 wherein the indicator indicates a set of the at least one UL resource configured by higher-layer signaling.

16. The network node according to claim 15 wherein the set of the at least one UL resource is indicated by an index in the UL grant indicating that for, the at least one UL time instance of the multiple time instances, the at least one UL resource of the set of resources, is excluded from, or added to, the UL resource allocation of the UL grant.

17. A method performed by a communication device, the method comprising:
receiving, from a network node, an uplink, UL, grant comprising an UL resource allocation comprising UL resources in multiple UL time instances and further comprising an indicator indicating that, for at least one UL time instance of the multiple time instances, at least one UL resource is excluded from or added to the UL resource allocation of the UL grant;
decoding the UL grant and the indicator in the UL grant;
determining, from the UL grant, the UL resource allocation and determining, from the indicator, the at least one UL resource; and
transmitting, uplink data to the network node, in accordance with the determined UL resource allocation and the determined at least one UL resource.

18. The method according to claim 17, further comprising, upon determining that the indicator indicates that for the least one UL time instance, the at least one UL resource is excluded from the UL resource allocation of the UL grant; refraining from transmitting uplink data to the network node on the at least one excluded UL resource.

19. The method according to claim 17, further comprising, upon determining that the indicator indicates that for the least one UL time instance, the at least one UL resource is added to the UL resource allocation of the UL grant; transmitting uplink data to the network node on the at least one UL resource of the resource allocation and also on the at least one added UL resource.

20. The method according to claim 17 where the at least one UL time instance is a first UL subframe following the time instance during which the UL grant including the indicator is received.

21. The method according to claim 17 wherein the indicator indicating that for a set of UL time instances comprising the at least one UL time instance, the at least one UL resource, is excluded from, or added to, the UL resource allocation of the UL grant.

22. The method according to claim 17 wherein the indicator is a bit field comprising at least one bit and wherein the bit field points at the at least one UL time instance of the multiple time instances.

23. The method according to claim 17 wherein the indicator indicates a set of the at least one UL resource configured by higher-layer signaling.

24. The method according to claim 23 wherein the set of the at least one UL resource is indicated by an index in the UL grant indicating that for, the at least one UL time instance of the multiple time instances, the at least one UL resource of the set of resources, is excluded from, or added to, the UL resource allocation of the UL grant.

25. A communication device comprising a processor and a memory, the memory comprising instructions executable by the processor whereby the communication device is operative to:
receive from a network node, an uplink, UL, grant comprising an UL resource allocation comprising UL resources in multiple UL time instances and further comprising an indicator indicating that, for at least one UL time instance of the multiple time instances, at least one UL resource is excluded from or added to the UL resource allocation of the UL grant;
decode the UL grant and the indicator in the UL grant;
determine, from the UL grant, the UL resource allocation and determining, from the indicator, the at least one UL resource; and
transmit, uplink data to the network node, in accordance with the determined UL resource allocation and the determined at least one UL resource.

26. The communication device according to claim 25, further comprising, upon determining that the indicator indicates that for the least one UL time instance, the at least one UL resource is excluded from the UL resource allocation of the UL grant; the communication device is operative to refrain from transmitting uplink data to the network node using the at least one excluded UL resource.

27. The communication device according to claim 25, further comprising, upon determining that the indicator indicates that for the least one UL time instance, the at least one UL resource is added to the UL resource allocation of the UL grant; the communication device is operative to transmit uplink data to the network node using the at least one UL resource of the resource allocation and also using the at least one added UL resource.

28. The communication device according to claim 25 where the at least one UL time instance is a first UL subframe following the time instance during which the UL grant including the indicator is received.

29. The communication device according to claim 25 wherein the indicator indicates that for a set of UL time instances comprising the at least one UL time instance, the at least one UL resource, is excluded from, or added to, the UL resource allocation of the UL grant.

30. The communication device according to claim 25 wherein the indicator is a bit field comprising at least one bit and wherein the bit field points at the at least one UL time instance of the multiple time instances.

31. The communication device according to claim 25 wherein the indicator indicates a set of the at least one UL resource configured by higher-layer signaling received from the network node.

32. The communication device according to claim 31 wherein the set of the at least one UL resource is indicated by an index in the UL grant indicating that for, the at least one UL time instance of the multiple time instances, the at least one UL resource of the set of resources, is excluded from, or added to, the UL resource allocation of the UL grant.

* * * * *